(12) United States Patent
Hong et al.

(10) Patent No.: US 11,728,506 B2
(45) Date of Patent: Aug. 15, 2023

(54) DEVICE FOR CHARGING AND DISCHARGING A BATTERY CELL AND METHOD OF CHARGING AND DISCHARGING BATTERY CELL USING THE SAME

(71) Applicant: LG ENERGY SOLUTION, LTD., Seoul (KR)

(72) Inventors: Suk Hyun Hong, Daejeon (KR); Joon Sung Bae, Daejeon (KR); Eui Kyung Lee, Daejeon (KR); Sang Jih Kim, Daejeon (KR); Beom Koon Lee, Daejeon (KR); Dong Hun Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/789,944

(22) PCT Filed: Nov. 22, 2021

(86) PCT No.: PCT/KR2021/017127
§ 371 (c)(1),
(2) Date: Jun. 29, 2022

(87) PCT Pub. No.: WO2022/119198
PCT Pub. Date: Jun. 9, 2022

(65) Prior Publication Data
US 2023/0029709 A1 Feb. 2, 2023

(30) Foreign Application Priority Data
Dec. 1, 2020 (KR) .................. 10-2020-0165330

(51) Int. Cl.
*H01M 10/44* (2006.01)
*H01M 10/04* (2006.01)
*H02J 7/00* (2006.01)

(52) U.S. Cl.
CPC ..... *H01M 10/0481* (2013.01); *H01M 10/446* (2013.01); *H02J 7/0042* (2013.01); *H02J 7/0068* (2013.01)

(58) Field of Classification Search
CPC .......... H01M 10/0481; H01M 10/446; H01M 10/46; H01M 10/0468; H01M 10/48; H01M 10/425; H02J 7/0042; H02J 7/0068
See application file for complete search history.

(56) References Cited

U.S. PATENT DOCUMENTS

2002/0043958 A1* 4/2002 Yamaguchi ........... H02J 7/0044
320/113
2011/0076549 A1* 3/2011 Kim .................... H01M 10/052
29/623.2
(Continued)

FOREIGN PATENT DOCUMENTS

JP 2010-21104 A 1/2010
JP 2011-134631 A 7/2011
(Continued)

OTHER PUBLICATIONS

International Search Report (PCT/ISA/210) issued in PCT/KR2021/017127, dated Mar. 4, 2022.

*Primary Examiner* — Raymond Alejandro
(74) *Attorney, Agent, or Firm* — Birch, Stewart, Kolasch & Birch, LLP (57) ABSTRACT

A device for charging and discharging a battery cell capable of suppressing a swelling phenomenon of a terrace portion of a battery cell during a formation process of the battery cell includes first and second plates configured to receive a
(Continued)

battery cell therebetween and to press two surfaces of the battery cell; first and second grippers connected to the first and second plates, respectively, the first and second grippers protrude to face each other and configured to contact a lead region of the battery cell; and first and second pressing pads positioned inward of the first and second grippers, the first and second pressing pads being configured to contact a terrace region of the battery cell. A method of charging and discharging a battery cell using the same is also provided.

13 Claims, 6 Drawing Sheets

(56) References Cited

U.S. PATENT DOCUMENTS

| | | |
|---|---|---|
| 2013/0244093 A1 | 9/2013 | Min et al. |
| 2014/0352140 A1 | 12/2014 | Tasaki et al. |
| 2016/0079635 A1 | 3/2016 | Niwa |
| 2016/0308569 A1* | 10/2016 | Wei ............... H04M 1/724092 |
| 2020/0153030 A1 | 5/2020 | Bae et al. |
| 2020/0365868 A1 | 11/2020 | Son et al. |

FOREIGN PATENT DOCUMENTS

| | | |
|---|---|---|
| KR | 10-2012-0060707 A | 6/2012 |
| KR | 10-2013-0044776 A | 5/2013 |
| KR | 10-2015-0134396 A | 12/2015 |
| KR | 10-1736137 B1 | 5/2017 |
| KR | 10-2019-0072289 A | 6/2019 |
| KR | 10-2020-0017825 A | 2/2020 |
| KR | 10-2077273 B1 | 2/2020 |
| KR | 10-2020-0053783 A | 5/2020 |
| KR | 10-2020-0118992 A | 10/2020 |

* cited by examiner

[FIG. 1]

CONVENTIONAL ART

CONVENTIONAL ART

DEVICE FOR CHARGING AND DISCHARGING A BATTERY CELL AND METHOD OF CHARGING AND DISCHARGING BATTERY CELL USING THE SAME

TECHNICAL FIELD

This application claims the benefit of priority based on Korean Patent Application No. 10-2020-0165330, filed on Dec. 1, 2020, and the entire contents of the Korean patent application are incorporated herein by reference.

The present invention relates to a device for charging and discharging a battery cell, and a method of charging and discharging a battery cell using the same.

BACKGROUND ART

Generally, the secondary battery may be divided into a cylindrical type, a prismatic type, a pouch type, etc., according to its shape. Herein, since the pouch type secondary battery is formed by using a pouch exterior material composed of a multilayer film including a metal layer (foil) and a synthetic resin layer coated on the upper and lower surfaces of the metal layer, the weight of the battery can be remarkably reduced compared to the cylindrical or square shape using metal cans, which makes it possible for the battery to be lightened and changed into various forms.

In such a pouch-type secondary battery, an electrode assembly is placed in a laminated form. An electrode tab and an electrode lead are connected to the electrode assembly, and the electrode lead protrudes from an exterior material of the pouch. Such an electrode lead is electrically connected to an external device through a contact and is supplied with power from the external device.

The pouch-type secondary battery (hereinafter, referred to as "battery cell") is manufactured through the process of assembling a cell and the process of activating the battery, and in the battery activation step, a battery cell is mounted on the charge and discharge device, and charge and discharge are performed as a condition which is necessary for activation. As described above, the process of performing a predetermined charge/discharge using a charging and discharge device for activation of the battery cell is referred to as a formation process.

In order to perform the formation process of such a battery cell, the battery cell should be properly mounted on the charging and discharging device. That is, the electrode lead of the battery cell needs to be disposed to contact the conductive portion of the charging and discharging device so that both are electrically connected, and the electrical connection state should be maintained while charging and discharging is in progress.

To this end, the charging and discharging device of the secondary battery generally includes a plurality of pressing plates for fixing a battery cell. Charging is performed by applying an electric current through the lead of the battery cell while applying pressure from two sides in a state that each battery cell is inserted between two pressing plates.

Likewise, it is possible to suppress the increase in the thickness of the battery cell according to gas generation during the charge and discharge process by pushing the battery cell using the pressing plate. At this time, the generated gas is collected in the gas pocket unit and is then removed after the formation process. Herein, the gas pocket unit is a portion extended in a direction perpendicular to the electrode lead in the cell body portion pressed during the formation process as a part of the pouch exterior material and may be cut in the pouch exterior material later.

Further, when a formation process is performed using a charge and discharge device according to a conventional art, the body portion of the battery cell forming the thickness of the battery cell may be pressed by the pressing plate during the charge and discharge process, but the cell terrace portion, which is the sealing portion of the pouch case, is not pressed by the pressing plate due to a step with the cell body portion.

As such, the internal pressure of the pouch case increases due to gases generated during the charge and discharge process, and adhesive layer of the terrace portion of the battery cell is broken.

Figure 1:
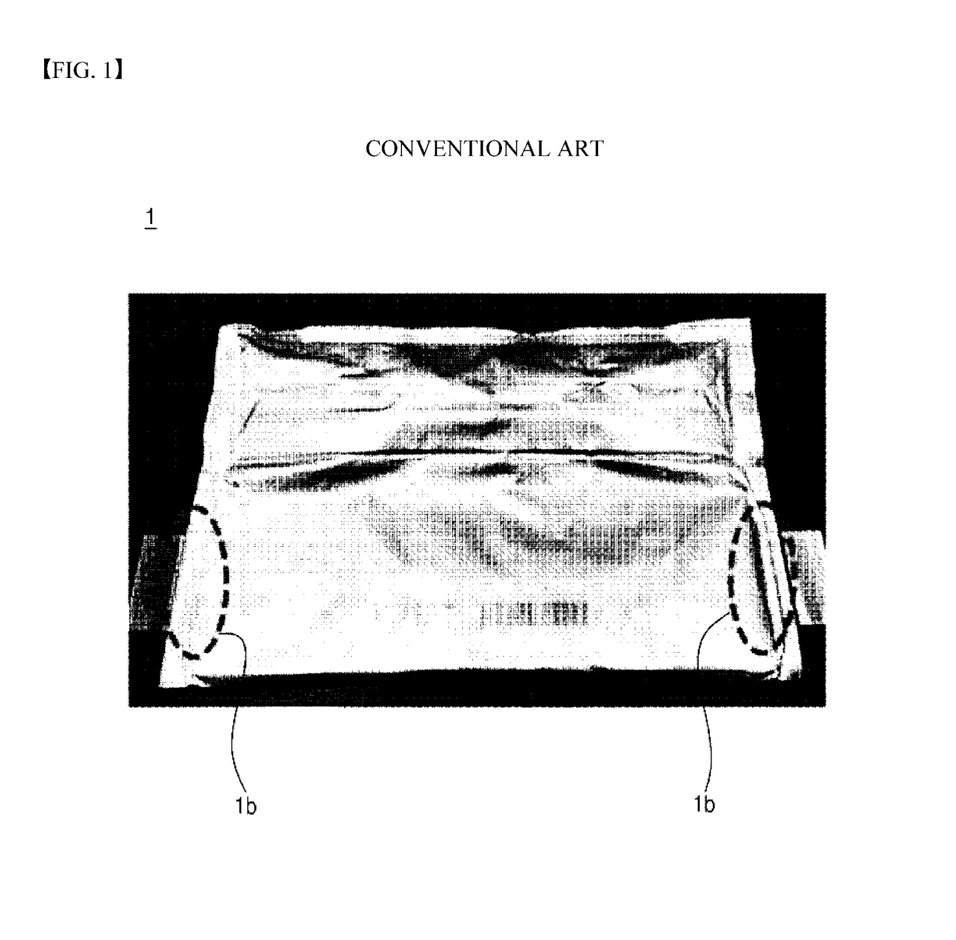
FIG. 1 is a photograph showing a pouch-type battery cell having gone through a formation process according to a conventional art.
Figure 2:
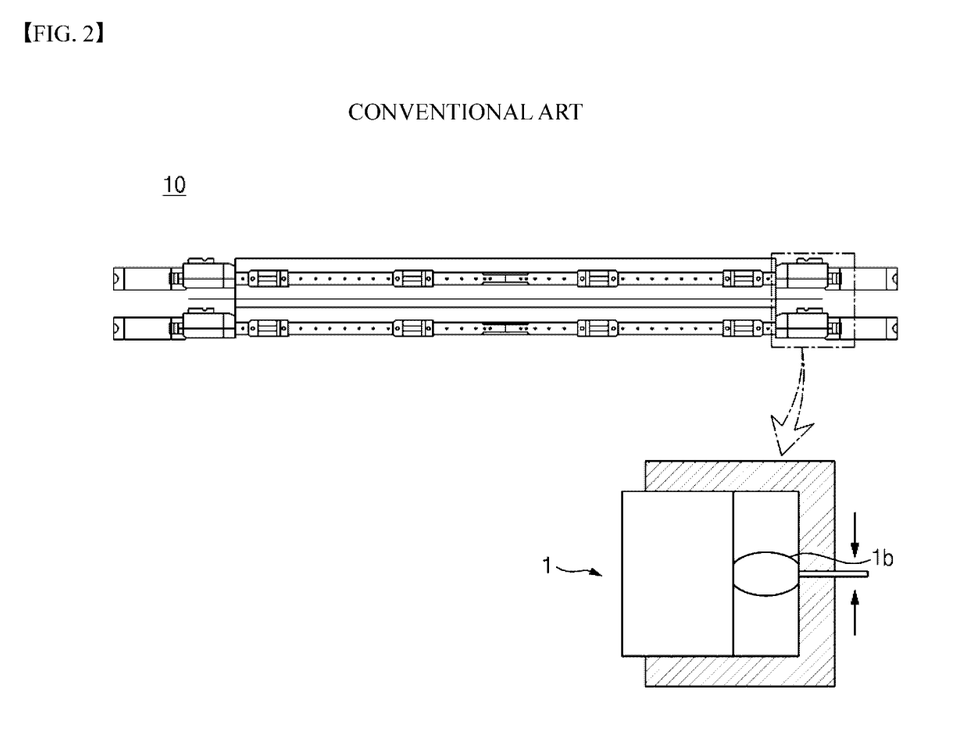
FIG. 2 is a schematic diagram showing a terrace portion of a pouch-type battery cell having gone through a formation process according to a conventional art.

FIG. 1 is a photograph showing a pouch-type battery cell having gone through a formation process according to a conventional art, and FIG. 2 is a schematic diagram showing a terrace portion of a pouch-type battery cell having gone through a formation process according to a conventional art.

Referring to FIGS. 1 to 2, a swelling phenomenon may occur in the pouch-type battery cell 1, which has gone through the formation process according to a conventional art, as the inner adhesive layer of the cell terrace region 1b is broken. Further, the pouch case may be composed of an outer insulating layer and an inner adhesive layer made of a polymer material, and a metal layer interposed between the outer insulating layer and the inner adhesive layer. Herein, an insulation voltage defect is caused as a metal layer of the cell terrace portion 1b is exposed by the above-described phenomenon.

Hence, since serious problems may be caused in the operation of such a battery cell, there is a need for a charging and discharging device and method capable of suppressing a swelling phenomenon of a terrace portion of a cell.

DISCLOSURE

Technical Problem

The present invention is believed to solve at least some of the above problems. For example, an aspect of the present invention provides a device for charging and discharging a battery cell capable of suppressing a swelling phenomenon of a terrace portion of a battery cell during a formation process of the battery cell, and a method of charging and discharging a battery cell using the same.

Technical Solution

The present invention provides a device for charging and discharging a battery cell capable of suppressing a swelling phenomenon of a terrace portion of a battery cell. In one example, a device for charging and discharging a battery cell according to the present invention includes: first and second plates configured to receive a battery cell therebetween and to press two surfaces of the battery cell; first and second grippers connected to the first and second plates, respectively, the first and second grippers protrude to face each other and configured to contact a lead region of the battery cell; and first and second pressing pads positioned inward of the first and second grippers, the first and second pressing pads being configured to contact a terrace region of the battery cell.

In a specific example, a first elastic pressing member is interposed between the first pressing pad and the first plate, a second elastic pressing member is interposed between the second pressing pad and the second plate. As such, the first and second pressing pads press the terrace region of the battery cell when the first and second grippers contact the lead region of the battery cell.

In one example, the elastic pressing member is a coil spring, a leaf spring, or a rubber.

In one example, the first and second grippers protrude to have a height greater than that in a state in which the first and second pressing pads are restored by the first and second elastic pressing members.

In another example, the first and second grippers have an embossed or debossed grid on a surface contacting the lead region of the battery cell.

In further another example, a third elastic pressing member is interposed in at least one of a space between the first gripper and the first plate or a space between the second gripper and the second plate.

Further, each of the first and second pressing pads may have a bar shape having a size corresponding to 80% or more of a width and a length of the terrace region of the battery cell.

In a specific example, the first gripper is provided as a plurality of first grippers connected to opposite ends of the first plate, respectively, and the plurality of first grippers are arranged to be perpendicular to the first plate, and the second gripper is provided as a plurality of second grippers connected to opposite ends of the second plate, respectively, and the plurality of second grippers are arranged to be perpendicular to the second plate.

Further, the first elastic pressing member is provided as a plurality of first elastic pressing members, the first pressing pad is provided as a plurality of first pressing pads mounted on the opposites sides of the first plate, respective, by the plurality of first elastic pressing members, and the plurality of first pressing pads are mounted at inner sides of the first grippers. Further, the second elastic pressing member is provided as a plurality of second elastic pressing members, the second pressing pad is provided as a plurality of second pressing pads mounted on the opposite sides of the second plate, respectively, by the plurality of second elastic pressing members, and the plurality of second pressing pads are mounted at inner sides of the second grippers.

In one example, the first and second plates are made of an insulating material. Further, the first and second grippers are made of a conductive material.

In one example, each of the first and second grippers has an electric current terminal for electric current application, which is configured to contact and be electrically connected to the lead region of the battery cell, and each of the first and second grippers has a voltage terminal for voltage detection, which is configured to contact and be electrically connected to the lead region of the battery cell.

Further, the present invention provides a method for charging and discharging a battery cell using the above-described device for charging and discharging a battery cell. The method includes placing the battery cell between the first and second plates; and pressing the first and second pressing pads against the terrace of the battery cell.

Advantageous Effects

According to a device for charging and discharging a battery cell and a method of charging and discharging a battery cell using the same of the present invention, it is possible to suppress a swelling phenomenon of a terrace region of a battery cell during a formation process of the battery cell by including first and second pressing pads which press the terrace region of the battery cell.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a device for charging and discharging a battery cell, and a method of charging and discharging a battery cell using the same.

When a formation process is performed using a charge and discharge device according to a conventional art, the body portion of the battery cell forming the thickness of the battery cell may be pressed by the pressing plate during the charge and discharge process, but the cell terrace portion, which is the sealing portion of the pouch case, is not pressed by the pressing plate due to a step with the cell body portion. As such, the internal pressure of the pouch case increases due to gases generated during the charge and discharge process, and adhesive layer of the terrace portion of the battery cell is broken. Further, the pouch case may be composed of an outer insulating layer and an inner adhesive layer made of a polymer material, and a metal layer interposed between the outer insulating layer and the inner adhesive layer. Herein, an insulation voltage defect is caused as a metal layer of the cell terrace portion is exposed by the above-described phenomenon.

As such, the present invention provides a device for charging and discharging a battery cell capable of suppressing a swelling phenomenon of a terrace portion of a battery cell during a formation process of the battery cell, and a method of charging and discharging a battery cell using the same. Specifically, according to a device for charging and discharging a battery cell and a method of charging and discharging a battery cell using the same of the present invention, it is possible to suppress a swelling phenomenon of a terrace region of a battery cell during a formation process of the battery cell by including first and second pressing pads which press the terrace region of the battery cell.

Hereinafter, a device for charging and discharging a battery cell, and a method of charging and discharging a battery cell using the same according to the present invention will be described in detail.

In one example, a device for charging and discharging a battery cell according to the present invention includes: first and second plates which have a battery cell therebetween and press two surfaces of the battery cell; first and second grippers which are respectively connected to the first and second plates and protrude at a portion facing each other to contact a lead region of the battery cell; and first and second pressing pads which are positioned at an inside of the first and second grippers to contact a terrace region of the battery cell. In a specific example, an elastic pressing member is interposed between the first pressing pad and the first plate and between the second pressing pad and the second plate. As such, the first and second pressing pads may press the terrace region of the battery cell.

Generally, in the formation process, the battery cell may swell due to gas generation or expansion of the positive electrode plate and the negative electrode plate. At this time, the first and second plates prevent the swelling by pressing the battery cells during the formation process. Specifically, in the charging and discharging device according to the present invention, first and second plates are arranged at regular intervals and are configured to be movable so that the interval may increase or decrease. Namely, the battery cell is arranged between first and second plates, and the first and second plates are moved in a direction that presses both surfaces of the battery cell to thereby press the battery cell.

Further, the first and second plates are connected in a manner that allows a transitional motion along the shaft extended in one side, gears are connected to one end of the shaft, and a drive motor may be connected to the gears. Herein, any mechanical combination may be used as long as it has a driving mechanism capable of moving first and second plates in a direction that presses battery cells.

The battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

Figures of the present invention show only a pouch-type battery cell having a form where a pair of electrode leads are withdrawn in the opposite direction for the convenience of explanation, but the battery cell, which is applied to the battery module according to the present invention, is not particularly limited thereto, and a pair of electrode leads may be withdrawn in the same direction. Herein, the pouch-type battery cell may include a gas pocket unit.

In one example, the first and second plates may be made of a metal material having a high mechanical rigidity so that they are not deformed at high heat and pressure. For example, aluminum or stainless steel may be used. However, the material of the pressing plate is not limited to a metal material, and the pressing plate may also be made of reinforced plastic, reinforced ceramic, or tempered glass.

In one example, battery cells including a gas pocket unit in a deactivated state are delivered by pickup equipment and are then inserted into a space between first and second plates.

In one example, the first and second grippers contact the lead regions of the battery cell to thereby apply an electric current to the battery cell and detect a voltage. Here, the lead region of the battery cell refers to the electrode lead. Particularly, the first and second grippers are configured to be integrally moved when the first and second plates are moved as the first and second grippers are respectively connected to the first and second plates. In a specific example, the first and second grippers have a structure which is connected to the first and second plates and protrude at a portion facing each other to contact a lead region of the battery cell. The first gripper may have a structure which is connected to each of both ends of the first plate, and is arranged to be perpendicular to the first plate, and the second gripper may have a structure which is connected to each of both ends of the second plate, and is arranged to be perpendicular to the second plate. At this time, the first and second grippers may be arranged in a region facing each other and easily fix the lead region of the battery cell.

In one example, the first and second grippers have an electric current terminal for electric current application, which contacts and is electrically connected to the lead region of the battery cell, and the first and second grippers have a voltage terminal for voltage detection, which contacts and is electrically connected to the lead region of the battery cell. The first and second grippers themselves may be composed of an electric current terminal and a voltage terminal. At this time, the first and second grippers may be made of a conductive member. For example, the first and second grippers may be made of aluminum, copper or nickel, for example, nickel or copper having an excellent electrical conductivity, or an alloy of copper and nickel. However, the present invention is not limited thereto.

In another example, the first and second grippers may further include an electric current terminal and a voltage terminal as described above. Particularly, the electric current terminal and the voltage terminal are configured to electrically contact the lead region of the battery cell when the first and second plates press the battery cell. Further, a cable for supplying an electric current terminal may be connected to the electric current terminal and the voltage terminal.

In another example, the first and second grippers have an embossed or debossed grid on a surface contacting the lead region of the battery cell. Specifically, the fixing force of the first and second grippers on the lead region of the battery cell may be enhanced by forming a grid on the surface of the first and second grippers. In the present invention, the grid means a grid or checkerboard scale pattern and is a general term indicating a form where two or more parallel patterns cross each other. In a specific example, an average recess depth or an average protrusion height of the debossed or embossed grid formed on the surface of the first and second grippers is in a range of 0.001 to 1 mm. For example, the average recess depth or protrusion height of the grid is in the range of 0.001 to 0.1 mm, 0.001 to 0.01 mm, 0.01 to 0.1 mm, or 0.01 to 0.05 mm. In the present invention, it is possible to enhance the fixing force with the lead region while not deteriorating the mechanical property of the lead region by forming a very low level of recess or protruding pattern.

In one example, the device for charging and discharging a battery cell according to the present invention includes first and second pressing pads which are positioned at the inside of the first and second grippers and contact the terrace region of the battery cell. The first and second pressing pads are used to suppress a swelling phenomenon of the terrace region of the battery cell during the formation process of the battery cell and are used to prevent pouch deformation in the terrace region of the battery cell. Further, an elastic pressing member is interposed between the first pressing pad and the first plate and between the second pressing pad and the second plate. In a specific example, the first pressing pad is mounted on both sides of the first plate respectively by the elastic pressing member and is mounted at an inner side of the first gripper. Further, the second pressing pad is mounted on both sides of the second plate respectively by the elastic pressing member and is mounted at an inner side of the second gripper.

In one example, the elastic pressing member is a coil spring, a leaf spring, or a rubber. For example, the elastic pressing member may be a coil spring. The coil spring is a spring having a force resistant to the compressive force and refers to a compression spring.

In one example, the first and second pressing pads may be integrally moved when the first and second plates are moved as the first and second pressing pads are respectively connected to the first and second plates and the elastic pressing member. Namely, when the first and second plates press the body region of the battery cell, the first and second pressing pads press the terrace region of the battery cell. At this time, the first and second pressing pads are elastically pushed into the elastic pressing member and an impact may be absorbed when contacting the terrace region of the battery cell, and the contacted state may be stably maintained as elastic restoring force of the elastic pressing member is applied.

In another example, the first and second grippers protrude to have a height greater than that in a state in which the first and second pressing pads are restored by the elastic pressing member. In a specific example, the first and second grippers protrude to have a height greater than that in a state, in which the first and second pressing pads are restored by the elastic pressing member, by about 10% or more. For example, when the height in a state that the first and second pressing pads are restored by the elastic pressing member is 20 mm, the height of the protruding structure of the first and second grippers becomes 22 mm. This is to prevent the first and second grippers from being separated from the lead region of the battery cell when a swelling phenomenon occurs in the terrace region during the formation process of the battery cell.

The first and second pressing pads may have a bar shape having a size corresponding to 80% or more of a width and a length of the terrace region of the battery cell. For example, the width and length of the first and second pressing pads may correspond to the width and length of the terrace region of the battery cell. This is to efficiently perform pressurization by increasing the area where the first and second pressing pads directly contact the terrace region of the battery cell. Further, the first and second pressing pads may be made of an epoxy material as a portion which directly contacts the terrace region of the battery cell.

Further, the first and second pressing pads may be integrally formed with the first and second grippers, respectively, but a step is not formed in the lead region and the terrace region of the battery cell, which is not desirable. Further, a swelling phenomenon may occur in the terrace region. As such, in the case that the first and second pressing pads are integrally formed with first and second grippers, respectively, the first and second grippers may be separated from the lead region of the battery cell.

In another example, further, in the device for charging and discharging a battery cell according to the present invention, an elastic pressing member is interposed between the first pressing plate and the first plate and between the second pressing plate and the second plate. For example, in the device for charging and discharging a battery cell according to the present invention, an elastic pressing member is interposed between the second gripper and the second plate.

In a specific example, when the first and second plates press the battery cell, the second gripper, which is connected to the elastic pressing member, is elastically pushed in and an impact may be absorbed when contacting the lead region of the battery cell, and the contacted state may be stably maintained elastic restoring force of the elastic pressing member is applied. Further, the elastic coefficient of the elastic pressing member disposed between the second gripper and the second plate may be different from the elastic coefficient of the elastic pressing member disposed between the pressing pad and the plate.

The device for charging and discharging a battery cell according to the present invention can easily fix the lead region and suppress swelling phenomenon of the terrace region of the battery cell during the formation process of the battery cell by this configuration.

Further, the present invention provides a method for forming a battery cell using the above-described device for forming a battery cell. In a specific example, the formation method of a battery cell according to the present invention may be performed after interposing a battery cell in the charge and discharge device of the battery cell. According to a method of charging and discharging a battery cell of the present invention, it is possible to suppress a swelling phenomenon of a terrace region of a battery cell during a formation process of the battery cell by including first and second pressing pads which press the terrace region of the battery cell. For example, the pressure range of the first and second pressing pads may range from 5 to 15 mm, and the battery cell can be pressed to about 10 mm on average.

Hereinafter, various forms of a device for charging and discharging a battery cell capable of suppressing a swelling phenomenon of a terrace portion of a battery cell during a formation process of the battery cell will be described with reference to drawings.

First Embodiment

Figure 3:
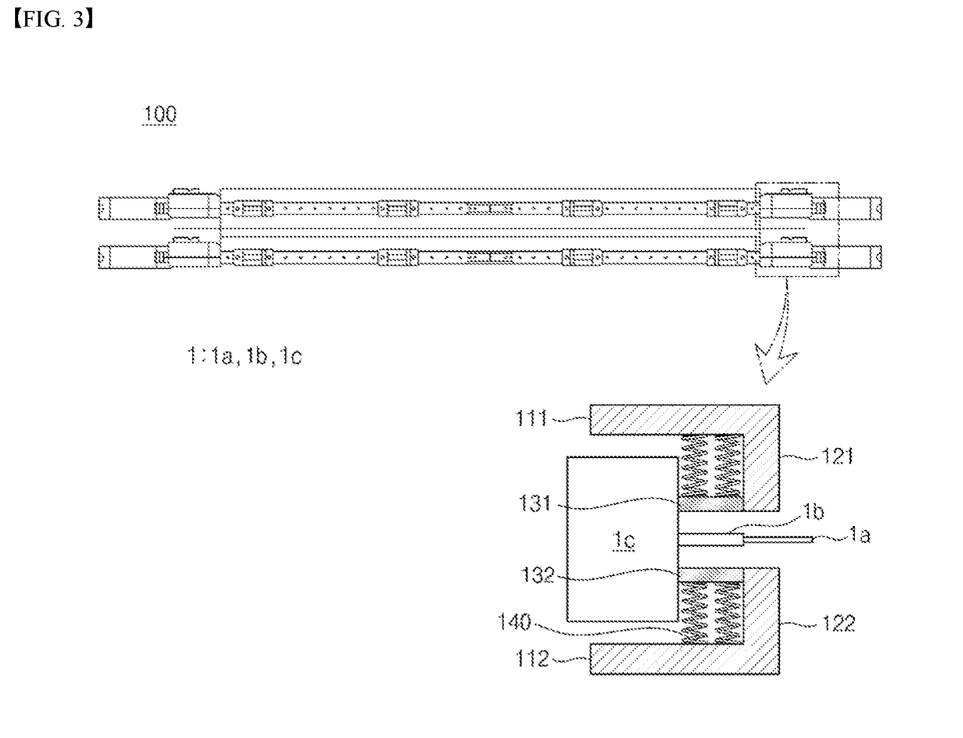
FIG. 3 is a schematic diagram showing a charge/discharge device of a battery cell according to one embodiment of the present invention.
Figure 4:
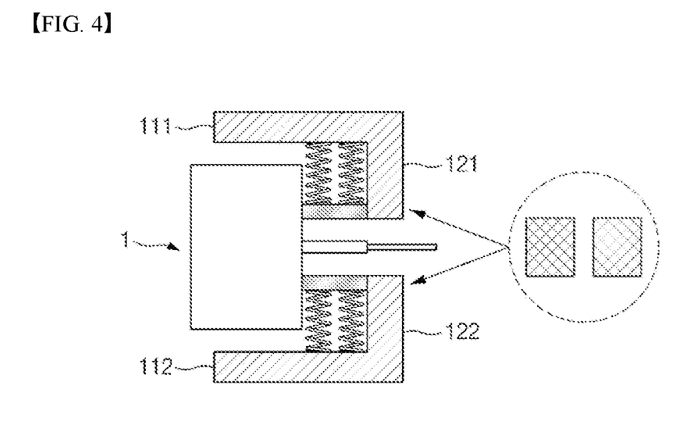
FIG. 4 is an enlarged view of a surface of a gripper in a device for charging and discharging a battery cell according to one embodiment of the present invention.
Figure 5:
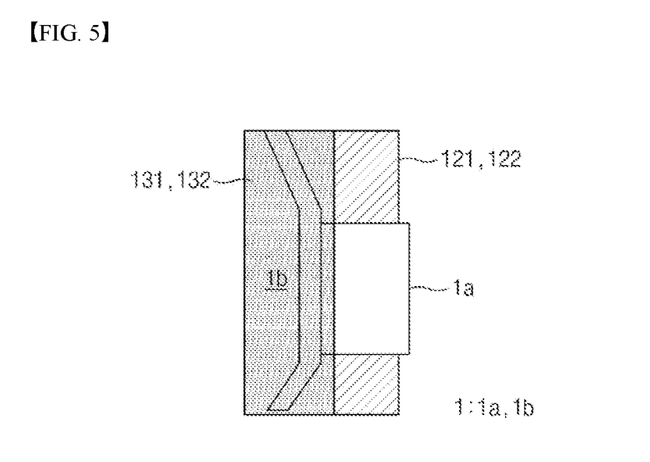
FIG. 5 is a diagram schematically showing a portion to which a pressing pad is applied when charging and discharging a battery cell using a device for charging and discharging a battery cell according to one embodiment.

FIG. 3 is a schematic diagram showing a charge/discharge device of a battery cell according to one embodiment of the present invention, FIG. 4 is an enlarged view of a surface of a gripper in a device for charging and discharging a battery cell according to one embodiment of the present invention, and FIG. 5 is a diagram schematically showing a portion to which a pressing pad is applied when charging and discharging a battery cell using a device for charging and discharging a battery cell according to one embodiment.

Referring to FIGS. 3 to 5, a device 100 for charging and discharging a battery cell includes: first and second plates 111 and 112 which have a battery cell therebetween and press two surfaces of the battery cell; first and second grippers 121 and 122 which are respectively connected to the first and second plates 111 and 112 and protrude at a portion facing each other to contact a lead region 1a of the battery cell 1; and first and second pressing pads 131 and 132 which are positioned at an inside of the first and second grippers 121 and 122 to contact a terrace region 1b of the battery cell 1. Particularly, in a device 100 for charging and discharging a battery cell according to the present invention, an elastic pressing member 140 is interposed between the first pressing pad 131 and the first plate 111 and between the second pressing pad 132 and the second plate 112. As such, the first and second pressing pads 131 and 132 may easily press the terrace region 1b of the battery cell 1.

In the formation process, the battery cell may swell due to gas generation or expansion of the positive electrode plate and the negative electrode plate. At this time, the first and second plates 111 and 112 are pressing plates which prevent the swelling by pressing the battery cells 1 during the formation process. Specifically, in the charging and discharging device 100 according to the present invention, first and second plates 111 and 112 are arranged at regular intervals and are configured to be movable so that the interval may increase or decrease. Namely, the battery cell 1 is arranged between first and second plates 111 and 112, and the first and second plates 111 and 112 are moved in a direction that presses both surfaces of the battery, cell 1 to thereby press the battery cell 1.

Although not illustrated in the drawings, first and second plates are connected in a manner that allows a transitional motion along the shaft extended in one side, gears are connected to one end of the shaft, and a drive motor may be connected to the gears. Herein, any mechanical combination may be used as long as it has a driving mechanism capable of moving first and second plates 111 and 112 in a direction that presses battery cells 1.

On the other hand, the first and second plates 111 and 112 are made of a material having a high rigidity so that they are not deformed by high heat and pressure. For example, the first and second plates 111 and 112 are made of a reinforced plastic.

In addition, the first and second grippers 121 and 122 contact the lead regions 1a of the battery cell 1 to thereby apply an electric current to the battery cell 1 and detect a voltage. Here, the lead region 1a of the battery cell 1 refers to the electrode lead. Particularly, the first and second grippers 121 and 122 are configured to be integrally moved when the first and second plates 111 and 112 are moved as the first and second grippers 121 and 122 are respectively connected to the first and second plates 111 and 112. The first and second grippers 121 and 122 are respectively connected to the first and second plates 111 and 112 and protrude at a portion facing each other to contact a lead region 1a of the battery cell 1. Specifically, the first gripper 121 is connected to each of both ends of the first plate 111 and is arranged to be perpendicular to the first plate 111. Further, the second gripper 122 is connected to each of both ends of the second plate 112 and is arranged to be perpendicular to the second plate 112.

The first and second grippers 121 and 122 have an electric current terminal (not shown) for electric current application, which contacts and is electrically connected to the lead region 1a of the battery cell 1, and the first and second grippers 121 and 122 have a voltage terminal (not shown) for voltage detection, which contacts and is electrically connected to the lead region 1a of the battery cell 1. The first and second grippers 121 and 122 may be composed of an electric current terminal and a voltage terminal, but the first and second grippers 121 and 122 may further include an electric current terminal and a voltage terminal as described above. Particularly, the electric current terminal and the voltage terminal are configured to electrically contact the lead region 1a of the battery cell 1 when the first and second plates 111 and 112 press the battery cell 1. Further, a cable (not shown) for supplying an electric current terminal is connected to the electric current terminal and the voltage terminal.

Further, the first and second grippers 121 and 122 have an embossed or debossed grid on a surface contacting the lead region 1a of the battery cell 1. Specifically, the fixing force of the first and second grippers 121 and 122 on the lead region 1a of the battery cell 1 may be enhanced by forming a grid on the surface of the first and second grippers 121 and 122 (see FIG. 4).

Further, the device 100 for charging and discharging a battery cell according to the present invention includes first and second pressing pads 131 and 132 which are positioned at an inside of the first and second grippers 121 and 122 to contact a terrace region 1b of the battery cell 1. The first and second pressing pads 131 and 132 are used to suppress a swelling phenomenon of the terrace region 1b of the battery cell 1 during the formation process of the battery cell 1 and are used to prevent pouch deformation in the terrace region 1b of the battery, cell 1. Further, an elastic pressing member 140 is interposed between the first pressing pad 131 and the first plate 111 and between the second pressing pad 132 and the second plate 112. Specifically, the first pressing pad 131 is mounted on both sides of the first plate 111 respectively by the elastic pressing member 140 and is mounted at an inner side of the first gripper 121. Further, the second pressing pad 132 is mounted on both sides of the second plate 112 respectively by the elastic pressing member 140 and is mounted at an inner side of the second gripper 122. At this time, the elastic pressing member 140 may be a coil spring.

The first and second pressing pads 131 and 132 may be integrally moved when the first and second plates 111 and 112 are moved as the first and second pressing pads 131 and 132 are respectively connected to the first and second plates 111 and 112 and the elastic pressing member 140. Namely, when the first and second plates 111 and 112 press the body region 1c of the battery cell 1, the first and second pressing pads 131 and 132 press the terrace region 1b of the battery cell 1. At this time, the first and second pressing pads 131 and 132 are elastically pushed into the elastic pressing member 140 and an impact may be absorbed when contacting the terrace region 1b of the battery cell 1, and the contacted state may be stably maintained as elastic restoring force of the elastic pressing member 140 is applied.

Further, the first and second grippers 121 and 122 protrude to have a height greater than that in a state in which the first and second pressing pads 131 and 132 are restored by the elastic pressing member 140. Further, it is illustrated that the first and second grippers 121 and 122 protrude to have a height greater than that in a state in which the first and second pressing pads 131 and 132 are restored by the elastic pressing member 140, but the present invention is not limited to this example. Specifically, the first and second grippers 121 and 122 protrude to have a height greater than that in a state, in which the first and second pressing pads 131 and 132 are restored by the elastic pressing member 140, by about 10% or more. For example, when the height in a state that the first and second pressing pads 131 and 132 are restored by the elastic pressing member 140 is 20 mm, the height of the protruding structure of the first and second grippers becomes 22 mm. This is to prevent the first and second grippers 121 and 122 from being separated from the lead region 1a of the battery cell 1 when a swelling phenomenon occurs in the terrace region 1b during the formation process of the battery cell 1.

Further, the first and second pressing pads 131 and 132 may have a bar shape having a size corresponding to 80% or more of a width and a length of the terrace region 1b of the battery cell 1. For example, the width and length of the first and second pressing pads 131 and 132 may correspond to the width and length of the terrace region 1b of the battery cell 1. This is to efficiently perform pressurization by increasing the area where the first and second pressing pads 131 and 132 directly contact the terrace region 1b of the battery cell 1. Further, the first and second pressing pads 131 and 132 may be made of an epoxy material as a portion which directly contacts the terrace region 1b of the battery cell 1 (see FIG. 5).

Further, the first and second pressing pads 131 and 132 may be integrally formed with the first and second grippers 121 and 122, respectively, but a step is not formed in the lead region 1a and the terrace region 1b of the battery cell 1, which is not desirable. Further, a swelling phenomenon may occur in the terrace region 1b. As such, in the case that the first and second pressing pads 131 and 132 are integrally formed with first and second grippers, respectively, the first and second grippers may be separated from the lead region 1a of the battery cell 1.

The device 100 for charging and discharging a battery cell according to the present invention can easily fix the lead region and suppress swelling phenomenon of the terrace region 1b of the battery cell 1 during the formation process of the battery cell 1 by this configuration.

Second Embodiment

Figure 6:
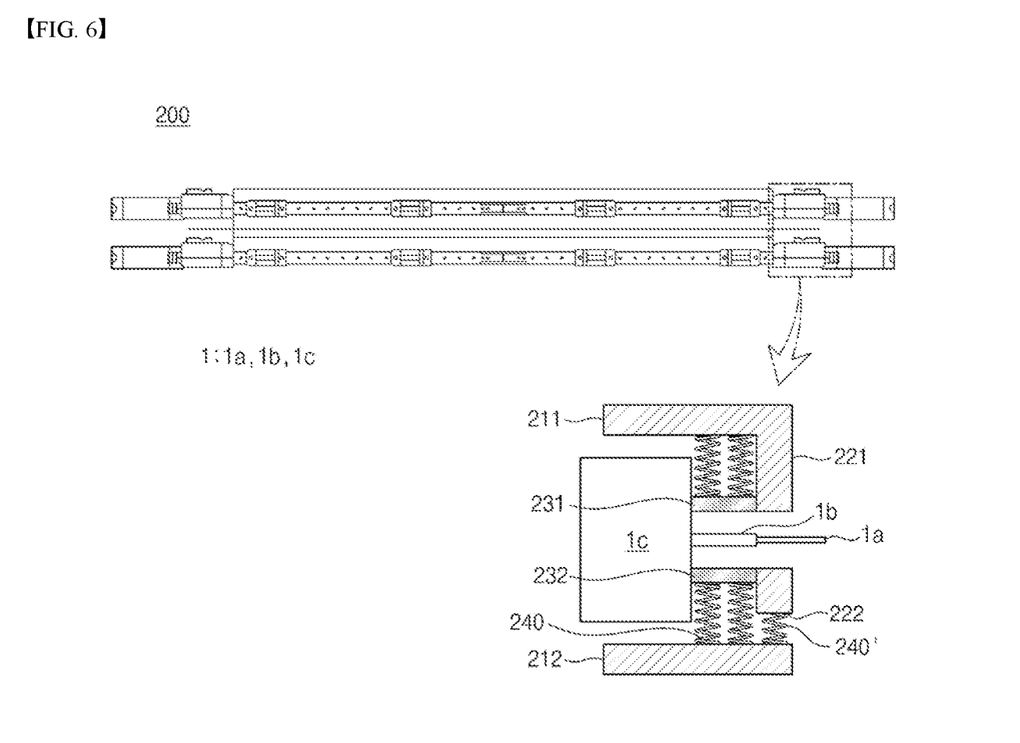
FIG. 6 is a schematic diagram showing a device for charging and discharging a battery cell according to one embodiment of the present invention.

FIG. 6 is a schematic diagram showing a device for charging and discharging a battery cell according to one embodiment of the present invention.

Referring to FIG. 6, a device 200 for charging and discharging a battery cell includes: first and second plates 211 and 212 which have a battery cell therebetween and press two surfaces of the battery cell; first and second grippers 221 and 222 which are respectively connected to the first and second plates 211 and 212 and protrude at a portion facing each other to contact a lead region 1a of the battery cell 1; and first and second pressing pads 231 and 232 which are positioned at an inside of the first and second grippers 221 and 222 to contact a terrace region 1b of the battery cell 1. Particularly, in a device 200 for charging and discharging a battery cell according to the present invention, an elastic pressing member 240 is interposed between the first pressing pad 231 and the first plate 211 and between the second pressing pad 232 and the second plate 212. As such, the first and second pressing pads 231 and 232 may easily press the terrace region 1b of the battery cell 1.

Further, in a device 200 for charging and discharging a battery cell according to the present invention, an elastic pressing member 240' is interposed between the first gripper 221 and the first plate 211 and between the second gripper 222 and the second plate 212. For example, in the device 200 for charging and discharging a battery cell according to the present invention, an elastic pressing member 240' is interposed between the second gripper 222 and the second plate 212.

Specifically, when the first and second plates 211 and 212 press the battery cell 1, the second gripper 222, which is connected to the elastic pressing member 240', is elastically pushed in and an impact may be absorbed when contacting the lead region 1a of the battery cell 1, and the contacted state may be stably maintained as elastic restoring force of the elastic pressing member 240' is applied. Further, the elastic coefficient of the elastic pressing member 240' disposed between the second gripper 222 and the second plate 211 may be different from the elastic coefficient of the elastic pressing member 240 disposed between the first and second pressing pads 231 and 232 and the first and second plates 211 and 212.

The device 200 for charging and discharging a battery cell according to the present invention can easily fix the lead region 1a and suppress swelling phenomenon of the terrace region 1b of the battery cell 1 during the formation process of the battery cell 1 by this configuration.

Since the configuration of the device for charging and discharging a battery cell of the present invention has been described above, the detailed description of each component will be omitted here.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS

1: battery cell
1a: lead region
1b: terrace region
1c: body region
10, 100, 200: device for charging and discharging a battery cell
111, 211: first plate
112, 212: second plate
121, 221: first gripper
122, 222: second gripper
131, 231: first pressing pad
132, 232: second pressing pad
140, 240, 240': elastic pressing member

The invention claimed is:

1. A device for charging and discharging a battery cell, the device comprising:
 first and second plates configured to receive a battery cell therebetween and to press two surfaces of the battery cell;
 first and second grippers connected to the first and second plates, respectively, the first and second grippers protrude to face each other and configured to contact a lead region of the battery cell; and
 first and second pressing pads positioned inward of the first and second grippers, the first and second pressing pads being configured to contact a terrace region of the battery cell,
 wherein a first elastic pressing member is interposed between the first pressing pad and the first plate, wherein a second elastic pressing member is interposed between the second pressing pad and the second plate, and wherein the first and second pressing pads press the terrace region of the battery cell when the first and second grippes contact the lead region of the battery cell.

2. The device of claim 1, wherein the elastic pressing member is a coil spring, a leaf spring, or a rubber.

3. The device of claim 1, wherein the first and second grippers protrude to have a height greater than that in a state in which the first and second pressing pads are restored by the first and second elastic pressing members.

4. The device of claim 1, wherein the first and second grippers have an embossed or debossed grid on a surface contacting the lead region of the battery cell.

5. The device of claim 4, wherein a recess depth or a protrusion height of a grid formed on the first and second grippers is in a range of 0.001 to 1 mm on average.

6. The device of claim 1, wherein a third elastic pressing member is interposed in at least one of a space between the first gripper and the first plate or a space between the second gripper and the second plate.

7. The device of claim 1, wherein each of the first and second pressing pads has a bar shape having a size corresponding to 80% or more of a width and a length of the terrace region of the battery cell.

8. The device of claim 1, wherein the first gripper is provided as a plurality of first grippers connected to opposite ends of the first plate, respectively, and the plurality of first grippers are arranged to be perpendicular to the first plate, and wherein the second gripper is provided as plurality of second grippers connected to opposite ends of the second plate, respectively, and the plurality of second grippers are arranged to be perpendicular to the second plate.

9. The device of claim 8, wherein the first elastic pressing member is provided as a plurality of first elastic pressing members, wherein the second elastic pressing member is provided as a plurality of second elastic pressing members, wherein the first pressing pad is provided as a plurality of first pressing pads mounted on the opposites sides of the first plate, respectively, by the plurality of first elastic pressing members, and the plurality of first pressing pads are mounted at inner sides of the plurality of first grippers, and wherein the second pressing pad is provided as a plurality of second pressing pads mounted on the opposite sides of the second plate, respectively, by the plurality of second elastic pressing members, and the plurality of second pressing pads are mounted at inner sides of the plurality of second grippers.

10. The device of claim 1, wherein the first and second plates are made of an insulating material, and wherein the first and second grippers are made of a conductive material.

11. The device of claim 1, wherein each of the first and second grippers has an electric current terminal for electric current application, which is configured to contact and be electrically connected to the lead region of the battery cell.

12. The device of claim 1, wherein each of the first and second grippers has a voltage terminal for voltage detection, which is configured to contact and be electrically connected to the lead region of the battery cell.

13. A method for charging and discharging a battery cell using the device according to claim 1, the method comprising:

placing the battery cell between the first and second plates; and pressing the first and second pressing pads against the terrace of the battery cell.

* * * * *